Figure 5A:
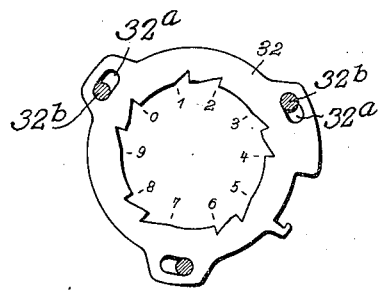
Figure 5B:
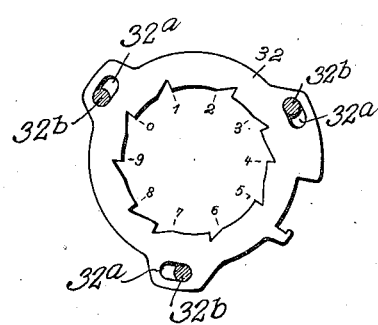
Figure 5C:
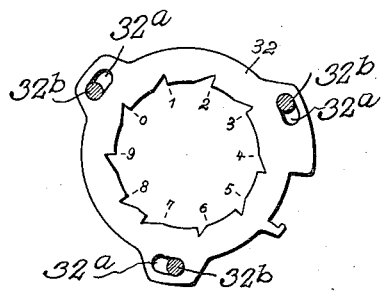
Figure 5D:
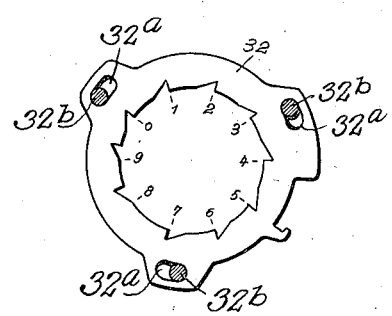

March 17, 1936. P. MANSEL 2,034,107
MACHINE FOR AUTOMATICALLY SORTING CARDS
Filed July 22, 1930 8 Sheets-Sheet 1
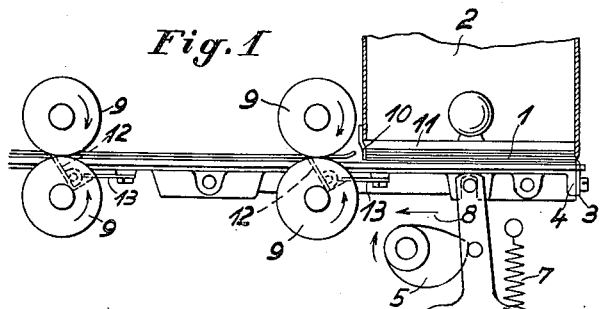
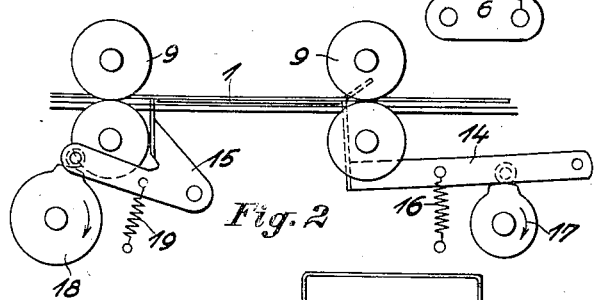
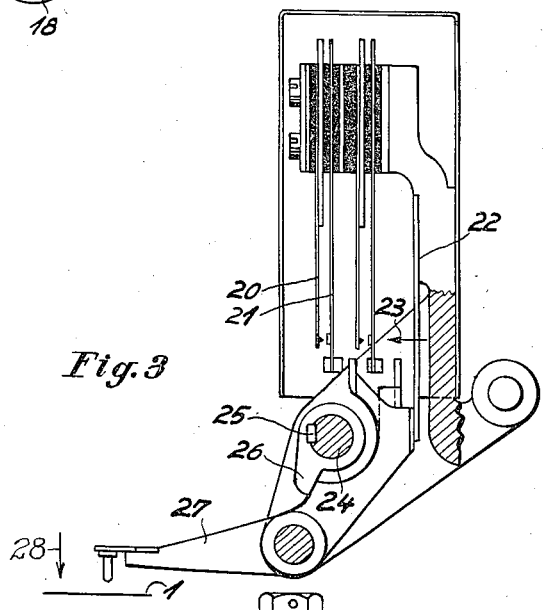
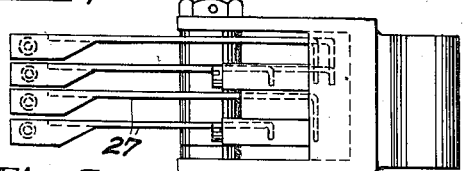
Inventor:
Paul Mansel
by
Lowe & Kehlenbeck
Attorneys.

March 17, 1936.    P. MANSEL    2,034,107
MACHINE FOR AUTOMATICALLY SORTING CARDS
Filed July 22, 1930    8 Sheets-Sheet 3

Inventor:
Paul Mansel
by
Loira & Kehlenbeck
Attorneys.

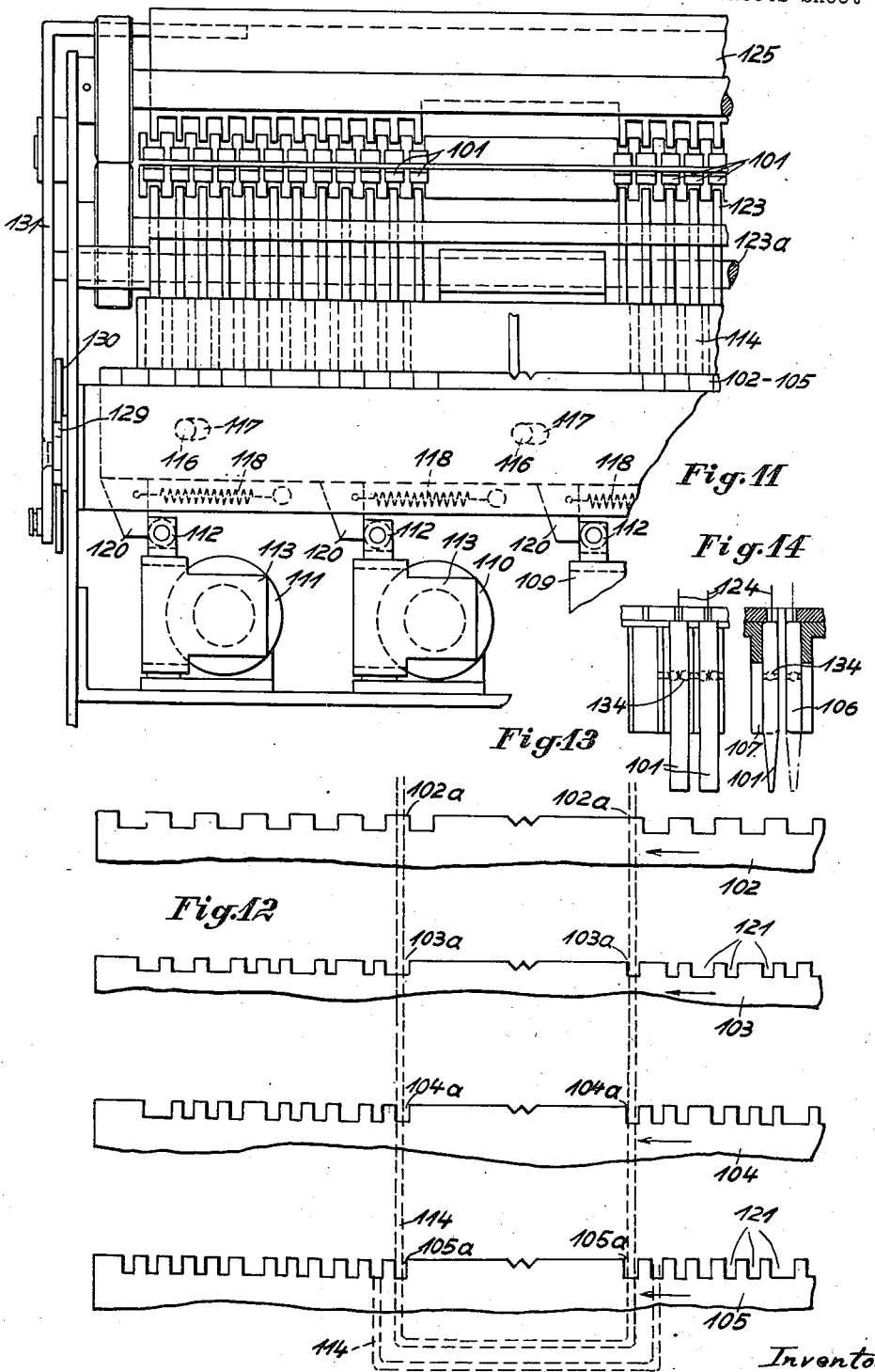

March 17, 1936.   P. MANSEL   2,034,107
MACHINE FOR AUTOMATICALLY SORTING CARDS
Filed July 22, 1930    8 Sheets-Sheet 8
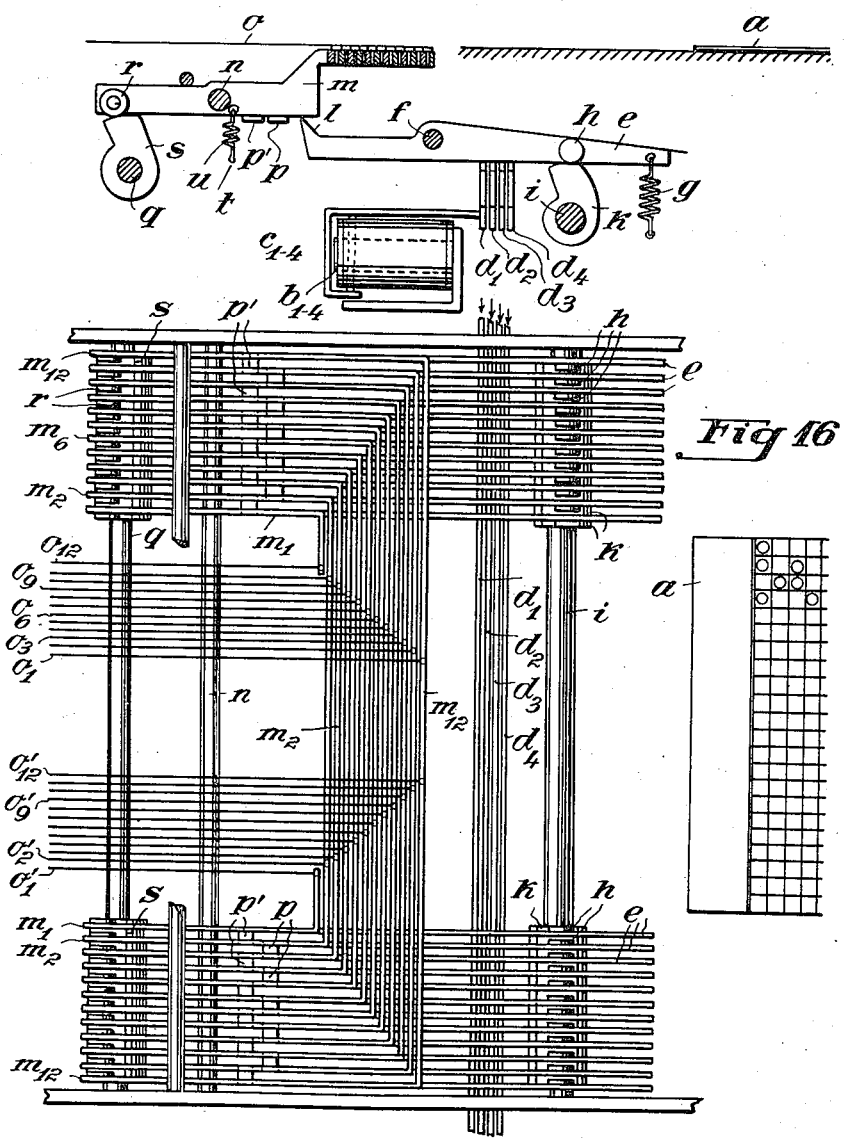
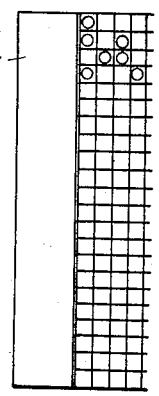
Inventor:
Paul Mansel
by Lotka & Kehlenbeck
Attorneys.

Patented Mar. 17, 1936

2,034,107

UNITED STATES PATENT OFFICE 2,034,107

MACHINE FOR AUTOMATICALLY SORTING CARDS

Paul Mansel, Berlin-Siemensstadt, Germany, assignor, by mesne assignments, to Siemens & Halske Aktiengesellschaft, Berlin-Siemensstadt, Germany, a corporation of Germany Application July 22, 1930, Serial No. 469,706
In Germany July 27, 1929

20 Claims. (Cl. 209—110)

My invention relates to machines for automatically sorting perforated cards into certain classifications determined by the relative location of the perforations. This is accomplished by mechanisms operated by electric current. The cards are caused to move from a receptacle past rollers to conveying means adapted to carry them through a series of selectors containing pins which may be set to select all cards having a certain combination of perforations.

In the machines of this type sliding rails or tapes placed above one another have hitherto been employed for conveying or guiding the cards through the machine. These means require excessively large frictional forces so that the working speed of such machines had of necessity to be kept relatively low.

According to my invention this drawback is eliminated and the working speed almost doubled in comparison with existing machines by using as conveying or guiding means a plurality of conveying or guiding means located side by side substantially in one plane and each movable independently of the other (for instance tapes or threads).

Embodiments of my invention are illustrated in the drawings affixed to my specification and forming part thereof. In the drawings Fig. 1 shows the card feeling device for the sorting machine in vertical section, Fig. 2, the arresting device holding the card during the feeling process, Fig. 3, the selector or feeler mechanism in elevation, Fig. 4, the selector or feeler mechanism in plan, Fig. 5, a conversion device by which the values of certain combinations of perforations in the card are converted into values of the natural series of numbers from 0 to 9, in side-elevation, Figs. 5a, 5b, 5c and 5d, discs showing internal teeth in side elevation, Fig. 6, a plan of Fig. 5, Fig. 7, the complete sorting machine in side-elevation, Fig. 8, a plan of Fig. 7, Fig. 9, a modified embodiment of a distributing device in side-elevation, Fig. 10, this control gear in plan, Fig. 11, this control gear in front-elevation, Fig. 12, the detailed construction of the control bars for the control gear according to Figs. 9 to 11, Fig. 13, the specific construction of the control noses in plan, Fig. 14, the same in section, Fig. 15, a further preferred control gear in section, and Fig. 16, the same in plan.

Referring in particular to Fig. 1 of the drawings, 2 is a receptacle or hopper into which the cards 1 are placed in a pile and from which the cards are individually withdrawn by means of a blade 3 mounted upon a slide 4 which is adapted to be reciprocated by a cam 5 by means of the lever 6 and the spring 7 in the direction of the arrow 8, and to be fed between the pair of rollers 9. A strip 10 depending from the front wall of the receptacle 2 permits only the passage of a single card at a time. Upon the pile of cards in the receptacle 2 is placed a loose cover or weight 11 to ensure that even the last card is with certainty withdrawn from the receptacle 2 by the gear described. Without this cover 11 the last card in the receptacle would have the tendency to bend without leaving the receptacle. On the slide 4 there are also mounted two drivers or catches 12 with springs 13 which during the movement of the slide 4 feed the cards 1 into the following pair of conveyor rollers and hence into the selector or feeler section or compartment. The card is, however, not yet in the correct position for the selector. For placing the card into the correct position there are provided levers 14 and 15, Fig. 2, which by means of springs 16 and 19 are kept in contact with the circumference of the cams 17 and 18 and by the movement of the cams 17 and 18 are brought into the corresponding position to maintain the card 1 in a definite position during the selecting process.

The selector device shown in detail in Figs. 3 and 4 consists substantially of the contact springs 20 and 21. The contact springs are provided with an insulation at their lower ends and are engaged by the selector levers 27 which are forced against the contact springs in the direction 23 by the leaf springs 22 but are locked in position by the abutment 26. This abutment is mounted on a spindle 24 by means of a key 25. On the spindle is also mounted a lever 29, Fig. 7, adapted to be vertically reciprocated by a slide 30, Fig. 7, by means of the levers 54, 55 and the cams 56 and 57.

Figure 7:
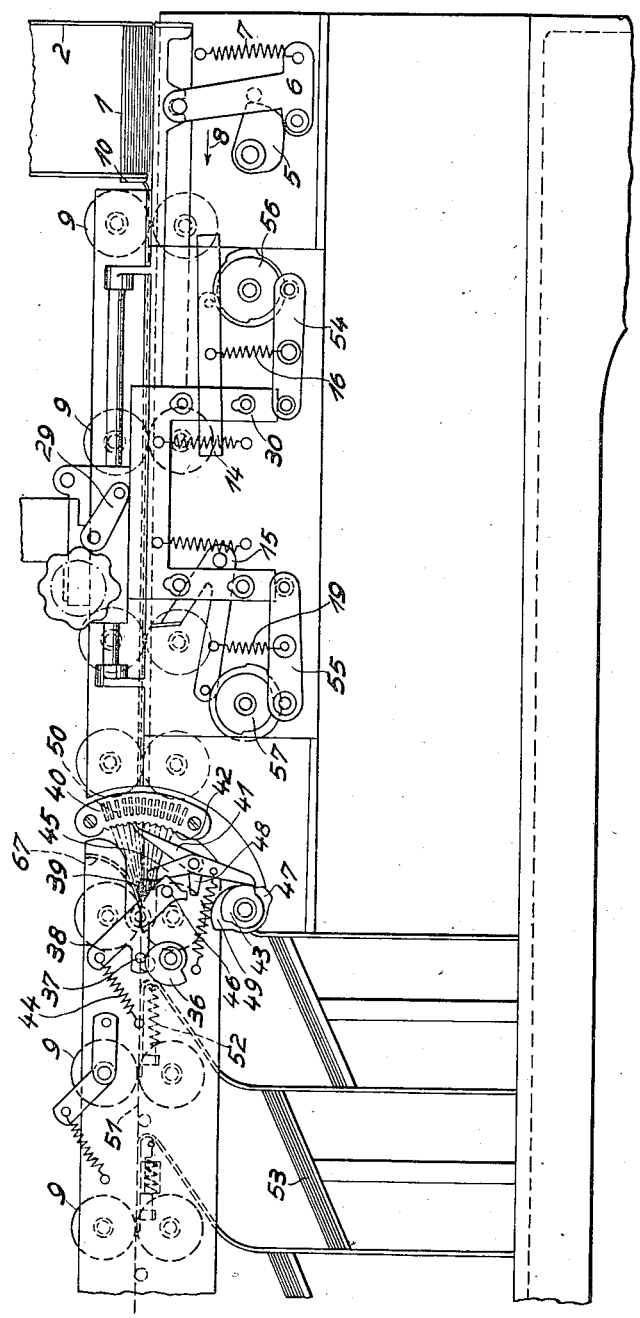
Figure 8:
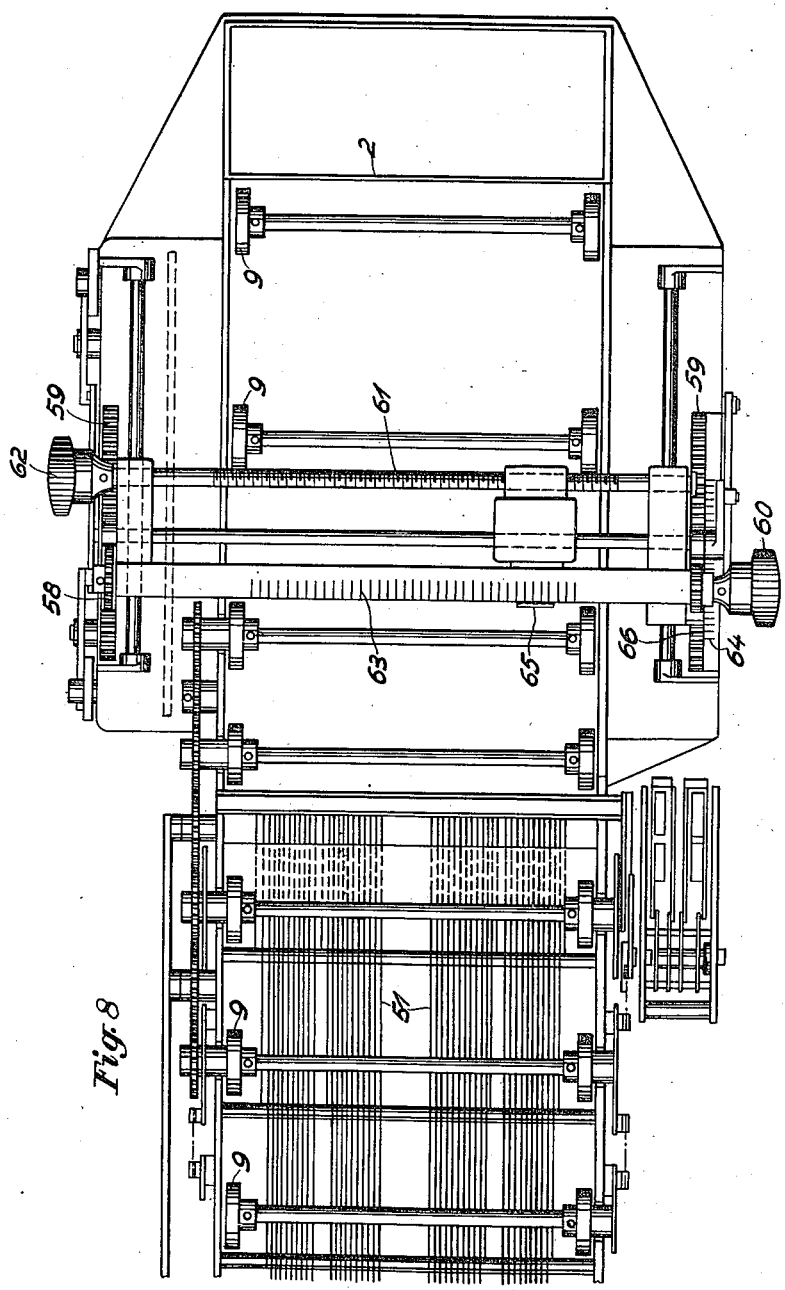

The selector device according to Fig. 3 of the drawings may by means of the pinion 58, the rack 59 and the knob 60, Fig. 8, be set for each row, and by means of the screw spindle 61 and the knob 62 for each column of the card 1. The position of the selector device may at any time be ascertained on the scales or graduations 63 and 64 and the pointers 65 and 66. During the selecting process the slide 30 (Fig. 7) is moved downwards and the abutment or latch 26 (Fig. 3) releases the selector levers 27. All the selector levers 27 are then under the control of the springs 22 forced down on to the card 1 in the direction of the arrow, Fig. 3. The contact springs 20 and 21 are not yet closed by the described operation. If the pin of the selector lever 27 finds a perforation in the card 1 it continues to descend still further and then closes the contact springs 20 and 21. The current impulse set up thereby energizes the electro-magnet 31 of the control gear shown in Fig. 5 belonging to the respective selector lever 27. The control gear illustrated in Fig. 5 includes four such electromagnets 31 with each of which a control disc 32 is associated, said four discs 32 being arranged side by side and being shown individually in Figs. 5a to 5d inclusive. Each of these control discs 32 is designated with one of the definite values 1, 2, 4 and 8 of a key combination, according to which the perforations in the cards are arranged. According to the aforesaid key, the value 1 is reproduced by a perforation in the first division of a four-division card field, and the values 2, 4 and 8 correspondingly by a perforation in the second, third and fourth divisions of said field respectively. All other values may be produced by adding together different combinations of the definite values 1, 2, 4 and 8, and, for their reproduction, different divisions of the four division card field are accordingly perforated; the following table will make this clear:—

The value 3 is built up by the definite value perforations 1 and 2.
The value 5 is built up by the definite value perforations 1 and 4.
The value 6 is built up by the definite value perforations 2 and 4.
The value 7 is built up by the definite value perforations 1, 2 and 4.
The value 9 is built up by the definite value perforations 1 and 8.
The value 0 is built up by the definite value perforations 2 and 8.

The four divisions of the aforesaid card field designed to reproduce a value may be located side by side vertically on the card, that is in the manner of columns, or as indicated in the foregoing example, horizontally, that is in lines or rows.

The annular control discs 32 are mounted, by means of slots 32a, on three bolts 32b, so that they may be rotated to a limited extent by the associated electromagnets 31. As shown in Figs. 5a–5d the discs 32 are provided on their inner circumferences with ten grooves which are differently arranged in each disc in accordance with the value designation of the individual discs. A ratchet pawl 35 (Fig. 5) co-operates with the aforesaid grooves and extends over and is common to all of the four control discs 32; this ratchet pawl 35 is arranged on an arm rotatably mounted on the spindle 33 and is drawn against the grooved circumferences of the control discs 32 by means of a conventional spring which has been omitted from the drawings for the sake of clearness. The spindle 33 is connected with the arm carrying the ratchet pawl 35 by a friction clutch 34.

Figure 5:
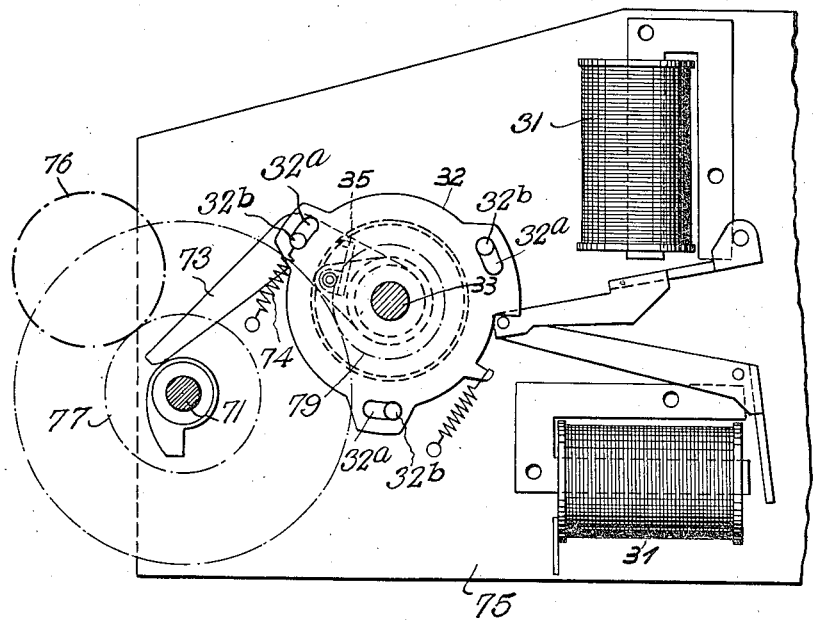

The control gear shown in Fig. 5 has the function of changing the value combinations contained on the cards into tens control steps, and particularly of adjusting the spindle 33 to a position corresponding with the value determined by the feeler or selector mechanism. According to the discs shown in Figs. 5a–5d ten such different positions are possible, as indicated by short radial lines and associated numerals. The latter indicate that, for the position "0" which represents the position of rest of the ratchet pawl 35, each of the discs include a groove. The disc 32 illustrated in Fig. 5a and designating the definite value 1, is provided with grooves in the settings 2, 4, 6 and 8, that is, in all settings of the ratchet pawl 35 for the establishment of which this disc is not adjusted, and additional grooves, which upon an adjustment of this disc, assume the settings 1, 3, 5, 7 and 9. Similarly the disc shown in Fig. 5b and designating the definite value 2, includes grooves in the settings 1, 4, 5, 8 and 9, and additional grooves, which upon rotation of this disc, assume the settings 2, 3, 6 and 7. The grooves for the disc 32 designating the definite value 4 (Fig. 5c) lie in the settings 1, 2, 3, 8 and 9 and in those settings, which upon rotation of this disc assume the positions 4, 5, 6 and 7. The disc 32 for the definite value 8 (Fig. 5d) has grooves in the settings 1, 2, 3, 4, 5, 6 and 7 and additional grooves, which upon rotation of this disc assume the settings 8 and 9. This groove arrangement, in keeping with the selected key combination, according to which all values incapable of being developed through a definite value, are produced as sums of several definite values, provides a range up to fifteen positions of the spindle 33.

In each of the positions to which the adjacent discs 32 are capable of being adjusted by the electromagnets 31, these grooves register with each other only in one position and therein permit the common ratchet pawl 35 to drop into place; when all of the discs are in the position of rest the ratchet pawl 35 is in the grooves of the settings "0". If one of the electromagnets 31 is energized and the associated disc 32 is accordingly rotated, this disc forces the pawl 35 out of the adjacent registering grooves and the spindle 33 is thereby free to rotate, until the pawl 35 finds those grooves of all four discs which are located in one row. At this point the ratchet pawl 35 drops into place and thereby locks the spindle 33 against movement. On the spindle 33 there is mounted a cam 36 which is consequently connected with the pawl 35 by the spindle 33. The circumferential curve of the cam 36 is an arithmetical spiral upon the position of which depends the setting of the hopper 40.

The feeler pin 37 riveted in the lever 38, Fig. 7 feels under the control of the spring 44 the position of the cam 36 and correspondingly sets the card funnel 40 through the pin 39. By means of the teeth 42 and the lever 41 the funnel is maintained in its position until the card 1 by the perforations of which the setting of the funnel 40 has taken place via the feeler device shown in Fig. 3 and the control mechanism illustrated in Fig. 4, has passed through the funnel. The cam 47 then throws the lever 41 out of engagement and now permits the setting of the funnel for the next card.

At that stage in the cycle of operation of the lever 41 with the teeth 42 the lever 38 is adjusted by the pin 46, the lever 45 and the cam 49 while the spring 44 is stretched, and the latch 48 locks the lever 38, controlled by the cams 43. The rounded plates 67 at both sides of the hopper have the object to cause the guide wires 51 to place themselves closely around a well-rounded edge. The funnel 40 is now set.

For restoring the control discs 32 to normal position, two cam disks 72 of corresponding form are fastened on a shaft 71, and two levers 73, under the influence of a spring 74, are maintained in engagement with the peripheries of said cam disks 72. On the levers 73, which are loosely mounted on the spindle 33, one of the three bolts 32b, which carry the control disks 32, is fastened, the aforesaid spring 74 having its one end connected to this bolt 32b and its other end secured to the frame of the control means.

The cam disks 72 come into operation after that card, which determined by the position of the funnel 40 (Fig. 7), has passed through the same, and swing the levers 73 with the aforesaid bolt 32b about the spindle 33, whereby the control disks 32 previously adjusted by means of the electromagnets 31, are restored to normal position. As a result of these operations the pawl 35 is again forced out of the grooves of the four control disks 32, which grooves up to this stage have all been in a line, until the pawl 35 drops into the grooves of said control disks 32 when said grooves register with each other in the zero position, and interrupts the rotation of the spindle 33 until a new setting is effected.

Figure 6:
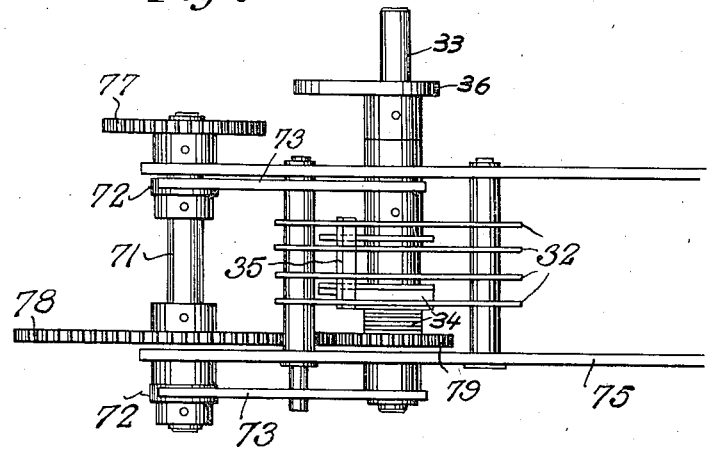

As shown in Figs. 5 and 6, the rotation of the spindle 33 is brought about by means of a gear 76, driven by an electric motor (not shown) and through the medium of gears 77 and 78 mounted on the shaft 71, the largest of said gears being in mesh with a gear 79 rotatably mounted on the spindle 33 and operatively combined with the friction clutch 34.

The funnel 40 is in accordance with the number of sorting compartments provided with partition walls 50 to which are soldered the guide wires 51. The other end of the guide wires is by means of the springs 52 secured to the walls of the sorting compartments facing away from the feeling mechanism. The transport rollers 9 conduct the cards 1 passing through the funnel 40 into the corresponding compartments. The card 1 then drops on to a card tray 53 which is forced upwards by a spring and which descends in correspondence with the number of cards and the aggregate weight of the same.

Figure 9:
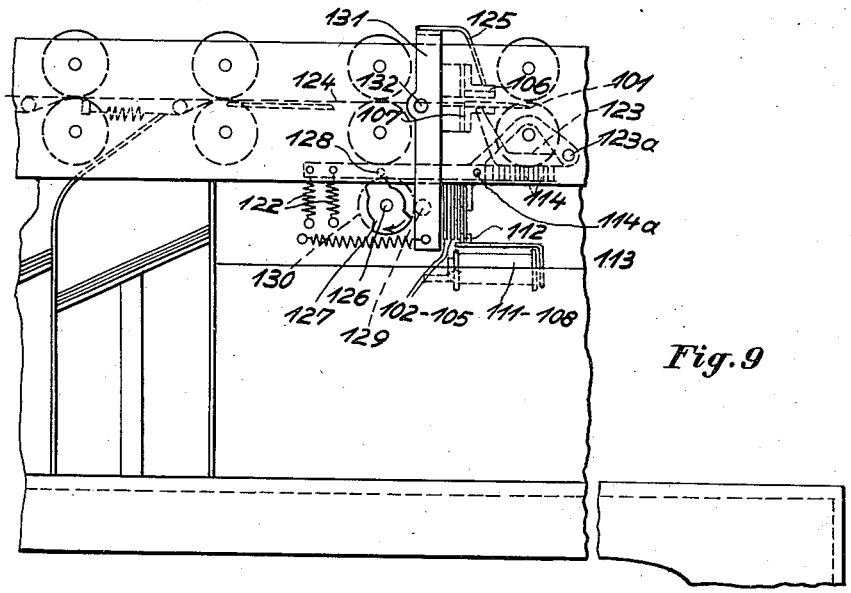
Figure 10:
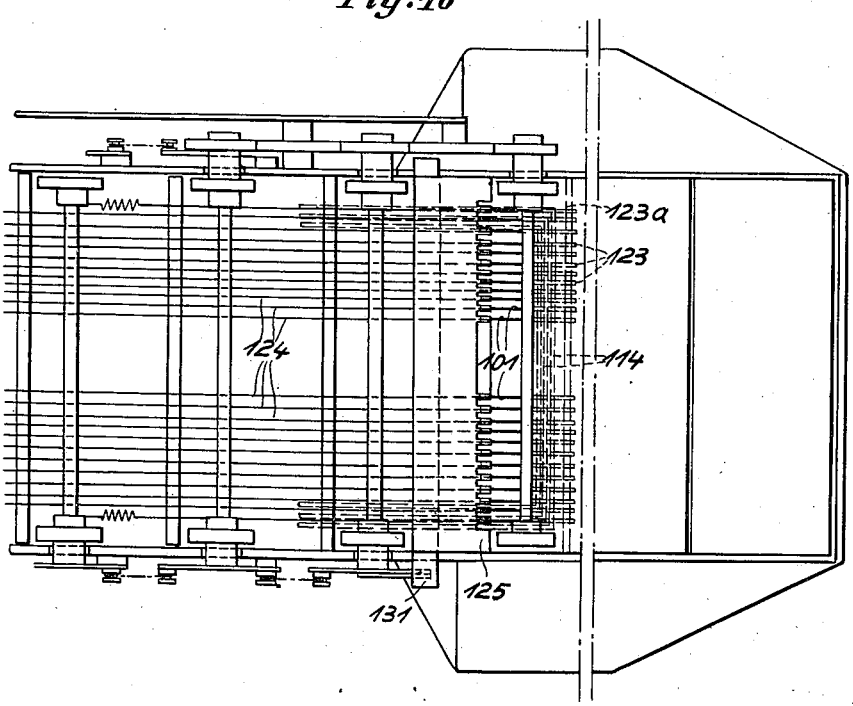

In the arrangements illustrated in the Figs. 9 to 14, which are modified embodiments of the invention, the cards to be sorted are, as already described, passed from a card receptacle to a feeler or selector mechanism whereby the electromagnets 108—111 are energized by means of contacts. By means of a rotatable roller 112 at one end of the armature 113 which engages an extension 120 of the control bars or rails 102—105 these bars are brought into preparatory positions for controlling the noses 101. As transmission members between the noses 101 and the control bars 102—105 U-shaped control bows 114 are provided which are journaled on a common spindle 114a (Fig. 9). The control bars are loosely supported on three pins 116 and are adapted to be laterally displaced within the slots 117. A spring 118 provided for each control member returns each bar into the inoperative position. The control bars are also provided with an extension 120 against which abuts the roller 112 connected with the armature of each electromagnet if the magnet is traversed by an electric current.

The control bars 102—105 are provided with notches 121. Into these recesses are adapted to be introduced the legs of U-shaped control bows 114 by springs 122 when the notches 121 are so displaced that the legs of a control bow are located above the notches of four control bars.

Fig. 12 shows diagrammatically a bow 114 located between the control bars. The four bars are shown turned over at right angles to the bow to facilitate the understanding. The legs are at the points 103a, 104a, 105a able to drop into the notch 121 but are prevented from doing so by the bar 102 at the point 102a. If the bar 102 is displaced by the electro-magnet in the direction of the arrow shown the legs of said bow are then able to engage the notch. The other loops engage the notches in exactly the same way but at another point in correspondence with the value determined by the feeler and the energization of the corresponding electro-magnets. If, for instance, the third bow is to be made use of for controlling the nose 101, the bars 102 and 103 are operated by the electro-magnet, in case of the sixth bow the bars 103 and 104. The notches are cut out at corresponding places of the bars. Only one bow can drop into a notch at a time. The selection of a bow is determined by the displacement of individual or a plurality of levers in succession or in combination. From the indication of the value given on the left-hand side of the bars, it can by addition be determined which bars should be moved in order to control a definite bow. The bows themselves control the levers 123 which are mounted on a common control shaft 123a in such a manner that the inner bow operates the two innermost levers 123, the next bow four levers, and the last bow all the levers 123. This mechanism thus regulates the control of the card to the respective compartment. The control levers abut with their outer ends against the control noses 101 and move them between the guides 106 and 107 upwards. Wires or tapes 124 are rigidly connected to the control nose. The control noses are maintained in the adjusted position by a notch 134. The noses are returned into the inoperative position by levers 125 after the card has left the control noses or switch points. The regulation of all the working processes takes place from a spindle 126 by control discs 127. One revolution of this spindle is equal to the transport of a card through the said mechanism. The control discs 127 abut against the rollers 128 which are connected with the control bow 114. The control bows are either released or raised by the control discs 127. Of the released bows only one is able to engage the bar which has in the meantime been adjusted by the electro-magnets 108—111, as pointed out before. In rigid connection with the same drum are provided two discs 130 mounted at the extreme end by which the levers 131 are controlled by means of the rollers 129. With the lever 131 is connected the common zero adjusting comb 125. The lever 131 is rotatably journaled upon a spindle 132. The spindle 126 as well as the corresponding transport wheels for the card are driven by an electric motor.

The mode of operation of the control gear is as follows: if a card is to be introduced into the respective sorting compartment the eletro-magnets 108—111 are first energized by feeler mechanisms as fully described before. These magnets displace the control bars 102—105. At that moment the U-shaped bows 114 are set free by the discs 127 of the drum 126 and the selected bow drops into the notches 121 of the control bars 102—105. The wires or tapes located behind the selected compartment are moved upwards while the others remain down. The cards pass through between these two series of wires, driven by the conveyor rollers, into the corresponding sorting compartment. The levers 123 are at once reversed after the card has been introduced between the noses since the control bars 102—105 have in the meantime been returned into the inoperative position. The fresh working process can already now be initiated by the next card.

In the control gear illustrated in Figs. 15 and 16 a card $a$ is again to be placed into a predetermined sorting compartment. The combinations of perforations on the card control through selector or feeler members, not shown here but fully described before, four control magnets $b_1$–$b_4$, the armatures $c_1$–$c_4$ of which are adapted to move one control bar $d_1$–$d_4$ each. According to the energization of one or more magnets $b$ one or more of the respective control bars $d$ are adjusted, in such a manner that a definite intermediate lever $e$ rotatable around the spindle $f$ is able to drop under the action of the spring $g$ into the tooth gaps of the four control discs located in a straight line.

In the inoperative position of the sorting machine the selected intermediate lever $e$ is prevented from rotation in a clockwise direction by a cam disc $k$ keyed to the spindle $i$ and apportioned to the lever, against which abuts the roller $h$ connected with the lever $e$. The intermediate lever $e$ controls through a nose $l$ a control lever $m$ rotatable around a spindle $n$ located outside the path of the cards and which is provided with guiding means $o$ according to the invention and consisting of wires.

In Fig. 16 there are illustrated two groups of twelve guide wires $o_1$–$o_{12}$ and $o_1'$–$o_{12}'$ respectively, two of which are apportioned to each sorting compartment. In the same manner the control levers $m$ combined in pairs to a bow and connected with these guide wires have been designated by the reference letters $m_1$–$m_{12}$. If it is desired, for instance, to convey a perforated card to the twelfth compartment, the bow $m_{12}$ is raised and perforated card moving from the right to the left is brought into such a position in relation to the guide wires $o$ that the wires $o_{12}$, $o_{12}'$ are located above the perforated card and the remaining guide wires below it. During the transport of the cards the guide wires $o_1$ to $o_{11}$ and $o_{11}'$ to $o_{12}'$ prevent the perforated card from dropping into the first sorting compartment, the wires $o_2$ to $o_{11}$ and $o_2'$ to $o_{11}'$ the dropping into the second compartment and so on, the pair of guiding wires $o_{11}$ and $o_{11}'$ the dropping of the card into the eleventh sorting compartment, while inasmuch as the twelfth pair of guide wires $o_{12}$, $o_{12}'$ is located above the card, the card is allowed to drop into the twelfth sorting compartment, preferably by the aid of special stationary guiding means provided.

If it is desired to lead a perforated card into the sixth sorting compartment the control bow $m_6$ is raised which through an extension $p$ at the bottom raises the bow $m$ which in its turn moves the next bow $m_8$ by the aid of an extension $p'$ and so on so that through the control of the bow $m_7$ the following bows $m_7$–$m_{12}$ are likewise lifted up, and the card moved from the right to the left consequently takes up such a position in relation to the pairs of guide wire $o$ that the pairs $o_1$–$o_5$ are located below, the pairs $o_6$–$o_{12}$ above the perforated card. In the manner corresponding with the present example the perforated card will thus be deposited in the sixth sorting compartment.

For the purpose of turning the control bows back into the inoperative position there are provided on each bow either control discs $s$ mounted on a common shaft and acting on a roller $r$, or springs $u$ engaging a stationary rod $t$, or both, as shown in Fig. 15 of the drawings.

The mode of operation of the mechanism just described is as follows:

The perforated card $a$ withdrawn from a pile is prior to reaching the sorting apparatus passed through a selector or feeler mechanism. According to the value of the combination of perforations one or more control bars $d_1$–$d_4$ are adjusted by the electro-magnets $b_1$–$b_4$. In order to reduce the adjusting work and the wear of the control discs the intermediate levers $o$ are during a setting process raised lightly either through the control discs $s$ or the cams $k$.

After completion of the adjusting process the cams $k$ and control discs $s$ respectively release the intermediate levers $e$ and control levers $m$ respectively so that under the action of the springs $g$ a pair of intermediate levers $e$ corresponding with the value of the card ascertained by the feeler drops into the tooth gaps of the control discs $d$ and the respective bow $m$ is raised and carries along other bows, if necessary.

Shortly after the perforated card has moved past the bow $m$ under the action of conveyor rollers, not shown, the intermediate pair of levers $e$ and the counter-clockwise moved bows are by cams $k$ and control discs $s$ respectively turned back into their inoperative position so that a further perforated card can become operative on the sorting apparatus.

It will be understood that constructional modifications may be made without departing from the spirit of my invention or the ambit of the appended claims.

I claim as my invention:

1. In a sorting machine for cards of the type having feed rollers for conveying the cards to sorting compartments, guiding means for the cards, said guiding means consisting of a plurality of wires all arranged side by side within the entire range of the sorting compartments and in substantially the feeding plane of the cards, and means for separating the guide wires to form a channel between the same.

2. In a card sorting machine of the class described a funnel for the cards subdivided into as many compartments as there exist sorting compartments, and guide wires for the cards located side by side and substantially in a single plane leading from said compartments to the partition walls between the funnel compartments.

3. In a card sorting machine of the class described a funnel for the cards subdivided into as many compartments as there exist sorting compartments, and guide wires for the cards located side by side and substantially in a single plane leading from said compartments to the partition walls between the funnel compartments, and guide faces to which said guide wires closely adhere according to the position of the card funnel.

4. In a sorting machine for cards of the type having feed rollers for conveying the cards to sorting compartments, guiding means for the cards, said guiding means consisting of a plurality of wires all arranged side by side within the entire range of the sorting compartments and in substantially the feeding plane of the cards and control noses (switches) adapted to bring said wires partly into an upper and partly into a lower position, in order to bring the card to be sorted into the correct position relatively to said wires.

5. In sorting machines for perforated cards of the type having feed rollers for conveying the cards to guiding means, guiding means consisting of a plurality of wires located side by side and substantially in a single plane parallel to the feeding plane of the cards, and control noses (switches) adapted to bring said wires partly into the upper and partly into the lower position, in order to bring the card to be sorted into the correct position to said wires, and control bars provided with notches adapted to be displaced by electro-magnets and selector lever contacts operatively associated with said control bars to control the same.

6. In sorting machines for perforated cards of the type having feed rollers for conveying the cards to guiding means, guiding means consisting of a plurality of wires located side by side and substantially in a single plane, and control noses (switches) adapted to bring said wires partly into the upper and partly into the lower position, in order to bring the card to be sorted into the correct position to said wires, control bars provided with notches adapted to be displaced by electro-magnets, selector lever contacts operatively associated with said control bars to control the same, and control bows adapted to influence levers for controlling said noses (switches).

7. In sorting machines for perforated cards of the type having feed rollers for conveying the cards to guiding means, guiding means consisting of a plurality of wires located side by side and substantially in a single plane parallel to the feeding plane of the cards, and control noses (switches) adapted to bring said wires partly into the upper and partly into the lower position, in order to bring the card to be sorted into the correct position to said wires, and a common control drum with control discs adapted to return said control noses into the inoperative position.

8. In a sorting machine for cards of the type having feed rollers for conveying the cards to sorting compartments, guiding means for the cards, said guiding means consisting of a plurality of wires all arranged side by side within the entire range of the sorting compartments and in substantially the feeding plane of the cards, control noses (switches) adapted to bring said wires partly into an upper and partly into a lower position, in order to bring the card to be sorted into the correct position relatively to said wires, and a member for returning all of said control noses into the zero position.

9. In sorting machines for perforated cards of the type having feed rollers for conveying the cards to guiding means, guiding means consisting of a plurality of wires located side by side and substantially in a single plane parallel to the feeding plane of the cards, and control noses (switches) adapted to bring said wires partly in the upper and partly into the lower position, in order to bring the card to be sorted into the correct position to said wires, a bar for returning all said control noses into the zero position, and control discs adapted to bring said zero bar into the operative position.

10. In a sorting machine for cards of the type having feed rollers for conveying the cards to sorting compartments, guiding means for the cards, said guiding means consisting of a plurality of wires all arranged side by side within the entire range of the sorting compartments and in substantially the feeding plane of the cards and control levers located outside of the path of the cards and operatively connected with said wires.

11. In a sorting machine for cards of the type having feed rollers for conveying the cards to sorting compartments, guiding means for the cards, said guiding means consisting of a plurality of wires all arranged side by side within the entire range of the sorting compartments and in substantially the feeding plane of the cards and control levers located outside of the path of the cards and operatively connected with said wires, said control levers in turn being rigidly connected with each other.

12. In sorting machines for perforated cards of the type having feed rollers for conveying the cards to guiding means, guiding means consisting of a plurality of wires located side by side and substantially in a single plane, and control levers located outside the path of the cards and operatively connected with said wires, the control levers apportioned to the individual sorting compartments adapted to influence one another by means of extensions in such a manner that the control movement of the control levers of one sorting compartment also moves the corresponding control levers of the preceding or following sorting compartments.

13. In sorting machines for perforated cards of the type having feed rollers for conveying the cards to guiding means, guiding means consisting of a plurality of wires located side by side and substantially in a single plane parallel to the feeding plane of the cards, control levers located outside the path of the cards and operatively connected with said wires, and cams adapted to release said levers for carrying out the control movement and to turn them back into the zero position.

14. In sorting machines for perforated cards, the combination comprising guiding means for directing cards into desired sorting compartments, said guiding means being located side by side in a single surface throughout substantially their entire length, feeding means for conveying said cards to said guiding means, means for setting said guiding means, means for selecting cards, sub-selecting means for controlling the setting means, the setting means consisting of levers located externally of the card path, and projections on said levers which, during the setting operation, will engage an adjacent lever and will set it at the same time.

15. In sorting machines for perforated cards, the combination comprising guiding means for directing cards into desired sorting compartments, said guiding means being located side by side in a single surface throughout substantially their entire length, feeding means for conveying said cards to said guiding means, means for setting said guiding means, means for selecting cards, sub-selecting means for controlling the setting means, the setting means consisting of levers located externally of the card path, and projections on said levers which, during the setting operation, will engage an adjacent lever and will set it at the same time and will also shift the lever associated with the next sorting compartment.

16. In sorting machines for perforated cards, the combination comprising guiding means for directing cards into desired sorting compartments, said guiding means being located side by side in a single surface throughout substantially their entire length feeding means for conveying said cards to said guiding means, means for setting said guiding means, means for selecting cards, sub-selecting means for controlling the setting means, the setting means consisting of levers located externally of the card path, projections on said levers which, during the setting operation, will engage an adjacent lever and will set it at the same time and will also shift the lever associated with the next sorting compartment, and cam disks which not only release the levers to permit their controlling movement, but also restore the levers to their normal position.

17. In sorting machines for perforated cards, the combination comprising guiding means for directing cards into desired sorting compartments, said guiding means being all located side by side in a single plane throughout substantially their entire length, feeding means for conveying said cards to said guiding means, means for setting said guiding means, means for selecting cards, and sub-selecting means for controlling the setting means, controlling members provided with notches and adapted to be set with electromagnets and selecting lever contacts in circuit with the said electromagnets.

18. In sorting machines for perforated cards, the combination comprising guiding means for directing cards into desired sorting compartments, said guiding means being all located side by side in a single plane throughout substantially their entire length, feeding means for conveying said cards to said guiding means, means for setting said guiding means, means for selecting ing cards, and sub-selecting means for controlling the setting means, control bars provided with notches and adapted to be set by electromagnets, selecting lever contacts located in circuits with said electromagnets, and control levers adapted to drop into the registering notches of the control bars and to set the setting means connected with the guiding means.

19. In a sorter mechanism a plurality of card conveying rolls, a plurality of groups of guiding wires cooperating therewith, all thereof being positioned substantially in a single plane, and substantially in the plane of contact with the conveying rolls, a switch mechanism connected to one end of said group of wires for determining the destination of a card conveyed by said rolls, a card perforation sensing means and a code translating means for the actuation of said switching means according to the indications transmitted thereto from said sensing means.

20. In a sorter mechanism, a plurality of card conveying rolls, a plurality of card pockets positioned thereunder, a plurality of sets of lead wires cooperating with said rolls and attached to said card pockets, said sets of wires being positioned substantially in a single plane substantially tangent to said conveying rolls, a selector mechanism connected to said set of wires for determining the card pocket destination of a card conveyed by said rolls, a card sensing means having electric contact members, and a code translating means comprising a magnet and selector system responsive to the actuation of said card sensing means for the operation of said switching means to determine the destination of a sensed card according to the perforations thereon.

PAUL MANSEL.